United States Patent [19]

Lee, Jr.

[11] 4,113,800

[45] Sep. 12, 1978

[54] HIGH IMPACT POLYPHENYLENE ETHER RESIN COMPOSITIONS THAT INCLUDE A-B-A BLOCK COPOLYMERS

[75] Inventor: Gim Fun Lee, Jr., Albany, N.Y.

[73] Assignee: General Electric, Pittsfield, Mass.

[21] Appl. No.: 527,142

[22] Filed: Nov. 25, 1974

[51] Int. Cl.$^2$ .................... C08L 51/00; C08L 53/00
[52] U.S. Cl. ..................... 260/876 B; 260/DIG. 24
[58] Field of Search ............... 260/876 R, 876 B, 874

[56] References Cited

U.S. PATENT DOCUMENTS

| | | | |
|---|---|---|---|
| 3,231,635 | 1/1966 | Holden et al. | 260/880 |
| 3,242,038 | 3/1966 | Dallas et al. | 161/253 |
| 3,299,174 | 1/1967 | Kuhre et al. | 260/876 |
| 3,333,024 | 7/1967 | Haefele et al. | 260/880 |
| 3,639,508 | 2/1972 | Kambour | 260/876 B |
| 3,810,957 | 5/1974 | Lunk | 260/876 B |
| 3,835,200 | 9/1974 | Lee | 260/876 B |

Primary Examiner—Richard B. Turer
Attorney, Agent, or Firm—Morgan, Finnegan, Pine, Foley & Lee

[57] ABSTRACT

Novel ultra high impact molding compositions have been made which comprise a polyphenylene ether resin, a block copolymer of an alkenyl aromatic compound and a diene rubber and a hydrogenated block copolymer of the A-B-A type wherein A is an alkenyl aromatic compound and B is a diene rubber block.

14 Claims, No Drawings

HIGH IMPACT POLYPHENYLENE ETHER RESIN COMPOSITIONS THAT INCLUDE A-B-A BLOCK COPOLYMERS

This invention comprises a novel thermoplastic molding composition which includes a polyphenylene ether resin, a block copolymer of an alkenyl aromatic compound and a diene rubber and a hydrogenated block copolymer of the A-B-A type wherein A is an alkenyl aromatic compound and B is a diene rubber block.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. No. 3,306,874 and 3,306,875, and in Stamatoff, 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ethers are found in Fox, U.S. Pat. No. 3,356,761; Sumitomo, U.K. Pat. No. 1,291,609; Bussink et al, U.S. Pat. No. 3,337,499; Blanchard et al, 3,219,626; Laakso et al, 3,342,892; Borman, 3,344,166; Hori et al, 3,384,619; Faurote et al, 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (Metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. All of the above-mentioned disclosures are incorporated herein by reference.

Many polyphenylene ether molding compositions have been described in the prior art. For example, U.S. Pat. No. 3,660,351 discloses compositions which comprise polyphenylene ethers with either a block copolymer of styrene-butadiene or a block copolymer of styrene-butadiene-styrene. These compositions are reported to have impact strengths between about 3 ft.lbs./in. notch and 8.9 ft. lbs./in. notch. It has now been found that when a composition is formed from a polyphenylene ether resin, a particular type of a block copolymer of styrene-butadiene and a hydrogenated block copolymer of styrene-butadiene-styrene, ultra-high impact strengths will be obtained. These impact strengths may be in excess of 15 ft. lbs./in. notch depending on the particular composition and are higher than the impact strengths of the individual components.

Accordingly, it is a primary object of this invention to provide high impact polyphenylene ether molding compositions.

It is also an object of this invention to provide reinforced and flame-retardant high impact polyphenylene ether molding compositions.

DESCRIPTION OF THE INVENTION

The above-mentioned objects are secured according to this invention by a composition which comprises:
(a) a polyphenylene ether resin;
(b) a block copolymer of an alkenyl aromatic compound and a diene rubber, said copolymer having a major amount of said alkenyl aromatic compound; and
(c) a hydrogenated block copolymer of the A-B-A type wherein A is an alkenyl aromatic block and B is a diene rubber block.

The preferred polyphenylene ether resins are of the formula:

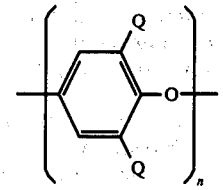

wherein the oxygen ether atom of one unit is connected to the benzene nucleus of the next adjoining unit; n the degree of polymerization and is at least 50 and each Q is a monovalent substituent selected from hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

The most preferred polyphenylene ether resin is poly(2,6-dimethyl-1,4-phenylene ether) resin.

The block copolymers of an alkenyl aromatic compound and a diene rubber (A-B copolymers) are derived from a compound of the formula:

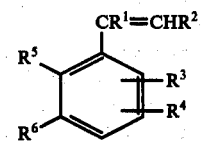

wherein $R^3$ and $R^4$ are selected from the group consisting of chloro, bromo, hydrogen and lower alkyl of from 1 to 6 carbon atoms; $R^5$ and $R^6$ are selected from the group consisting of hydrogen, lower alkyl and lower alkenyl group of 1 to 6 carbon atoms or $R^5$ and $R^6$ may be concatenated together with hydrocarbyl groups to form a naphthyl group; said compounds being free of any substituent having a tertiary carbon atom and the diene rubber is derived from a compound selected from the group consisting of 1,3-butadiene, 2-methyl-1,3-butadiene and 1,3-pentadiene. These block copolymers will have a major amount of the alkenyl aromatic component. The preferred A-B block copolymers are the styrene-butadiene block copolymers having 70–80 parts by weight of styrene units per 100 parts by weight of block copolymer. The total amount of the A component in the A-B block copolymers will be in the range of 60–90 parts by weight of block copolymer.

The A-B block copolymers may be made by procedures well known to those skilled in the art. For example, U.K. Pat. No. 1,145,923 discloses specific preparative methods for preparing block copolymers having a high content of alkenyl aromatic compound and materials such as KR 01 are commercially available from Phillips Petroleum Company. The hydrogenated block copolymers of the A-B-A type are made by means known in the art and they are commercially available.

These materials are described in U.S. Pat. No. 3,431,323 to Jones, which is hereby incorporated by reference.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene and the like or mixtures thereof. The end blocks may be the same or different. The center block may be derived from, for example, polyisoprene or polybutadiene.

The ratio of the copolymers and the average molecular weights can vary broadly although the molecular weight of the center block should be greater than that of the combined terminal blocks. It is preferred to form terminal blocks A having average molecular weights of 4,000-115,000 and center block B e.g., a polybutadiene block with an average molecular weight of 20,000 – 450,000. Still more preferably, the terminal blocks have average molecular weights of 8,000 – 60,000 while the polybutadiene polymer block has an average molecular weight between 50,000 and 300,000. The terminal blocks will preferably comprise 2-33% by weight, or more preferably, 5-30% by weight of the total block polymer. The preferred copolymers will be those formed from a copolymer having a polybutadiene center block wherein 35-55%, or more preferably, 40-50% of the butadiene carbon atoms are vinyl side chains.

The hydrogenated copolymers will have the average unsaturation reduced to less than 20% of the original value. It is preferred to have the unsaturation of the center block B reduced to 10%, or more preferably, 5% of its original value.

The block copolymers are formed by techniques well known to those skilled in the art. Hydrogenation may be conducted utilizing a variety of hydrogenation catalysts such as nickel or kieselguhr, Raney nickel, copper chromate, molybdenum sulfide and finely divided platinum or other noble metals on a low surface area carrier.

Hydrogenation may be conducted at any desired temperature or pressure, from atmospheric to 300 p.s.i.g. the usual range being between 100 and 1000 p.s.i.g. at temperatures from 75° F to 600° F for times between 0.1 and 24 hours, preferably from 0.2-8 hours. The composition of the invention will include from 5-25 parts by weight of the hydrogenated copolymer, or more preferably, from 10-20 parts by weight.

Hydrogenated block copolymers such as Kraton G-GXT-0650, Kraton G-GXTO-772 and Kraton G-GXT-0782 from Shell Chemical Company, Polymers Division have been found useable according to the present invention when the above-described block copolymers have been employed.

The composition of the invention may comprise from 10-80 parts by weight of polyphenylene ether resin or more preferably from 20-50 parts by weight of said polyphenylene ether resin. The A-B block copolymer may comprise from 30-65 parts by weight of the composition or more preferably from 20-50 parts by weight.

The compositions of the invention may also include fillers or reinforcing fillers, such as aluminum, iron or nickel, and the like and non-metals, such as carbon filaments, silicates, such as acicular calcium silicate, asbestos, titanium dioxide, potassium titanate and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.003 to 0.009 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about one-eighth inch to about 1 inch long, preferably less than one-fourth inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 inch and 0.125 (one-eighth inch).

The compositions of the invention may be prepared by blending the components in a Henschel mixer and thereafter compounding the mixture on a twin-screw 28 mm Werner-Pfleiderer extruder. Thereafter, the extrudate is chopped into pellets and molded on a Newbury injection molding machine.

Flame-retardant additives may also be added to the compositions of the invention. The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition — major proportions will detract from physical properties — but at least sufficient to render the polyphenylene ether-modified alkenyl aromatic polymer blend non-burning or self-extinguishing. Those skilled in the are are well aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsible for flame-retardance will be sufficient, e.g., elemental red phsophorus will be preferred at 0.5 to 10 parts by weight per hundred parts of (a) plus (b), while phosphorus in the form of triphenyl phsophate will be used at 5 to 25 parts of phosphate per part of (a) plus (b), and so forth. Halogenated aromatics will be used at 2 to 20 parts and synergists, e.g., antimony oxide, will be used at about 1 to 10 parts by weight per 100 parts of components (a) plus (b).

Among the useful halogen-containing compounds are those of the formula:

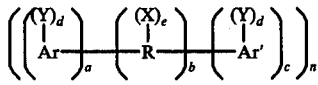

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be a dihydric phenol, e.g., bis-phenol-A, carbonate linkage. Other groups which are represented by R will occur to those skilled in the art. Compounds of this type are disclosed in U.S. Pat. No. 3,647,747 and U.S. Pat. No. 3,334,154 both of which are incorporated by reference.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0.

When $b$ is not 0, neither $a$ nor $c$ may be 0. Otherwise, either $a$ or $c$, but not both, may be 0. Where $b$ is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are diaromatics of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'- dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Especially preferred are hexabromobenzene and chlorinated biphenyls or terphenyls, alone or mixed with antimony oxide.

In general, the preferred phosphate compounds are selected from elemental phosphorus or organic phosphonic acids, phosphonates, phosphinates, phosphonites, phosphinites, phosphine oxides, phosphines, phosphites or phosphates. Illustrative is triphenyl phosphene oxide. These can be used alone or mixed with hexabromobenzene or a chlorinated biphenyl and, optionally, antimony oxide.

Typical of the preferred phosphorus compounds to be employed in this invention would be those having the general formula:

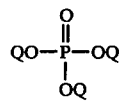

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenylbis-(3,6,5′-trimethylhexyl phsophate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl)phosphate, phenylmethyl hydrogen phosphate, di(dodecyl) p-tolyl phosphate, tricresyl phosphate, triphenyl phsophate, halogenated triphenyl phosphate, bibutylphenyl phsophate, 2-chloroethyldiphenyl phosphate, p-tolyl bis(2,5,5′-trimethylhexyl)phosphate, 2-ethylhexyldiphenyl phosphate, diphenyl hydrogen phosphate, and the like. The preferred phsophates are those where each Q is aryl. The most preferred phosphate is triphenyl phosphate. It is also preferred to use triphenyl phosphate in combination with hexabromobenzene, and optionally, antimony oxide.

Also suitable as flame-retardant additives for this invention are compounds containing phosphorus-nitrogen bonds, such as phsophonitrilic chloride, phosphorus ester amides, phosphoric acid amides, phosphonic acid amides, phosphinic acid amides, tris(aziridinyl)phosphine oxide or tetrakis (hydroxymethyl) phosphonium chloride. These flame-retardant are commercially available.

Other additives, such as antioxidants, UV absorbers, pigments and the like may also be added.

The blends may be formed by conventional techniques, that is by first dry mixing the components, and thereafter, melt blending the composition in an extruder.

DESCRIPTION OF THE PREFERRED EMBODIMENTS

The following examples are set forth as further descriptions of the invention, but are not to be construed as limiting the invention thereto.

EXAMPLE 1

A blended composition of 35 parts by weight of poly(2,6-dimethyl-1,4-phenylene ether) resin (IV of about 0.5 dl/g. in CHCl₃ at 30° C), 50 parts by weight of a block copolymer of styrene-butadiene having about 73.6 parts by weight of styrene and an intrinsic viscosity of 0.67 in CHCl₃ at 25° C (KR01 Phillips Petroleum) and 15 parts by weight of a hydrogenated A-B-A block copolymer of styrene-butadiene-styrene (Kraton G Shell Chemical Co.) are mixed and melt blended on an extruder. Injection molded test pieces were prepared and the following physical data were obtained.

| | |
|---|---|
| Tensile Yield | 6200 |
| Tensile Strength (psi) | 5800 |
| Elongation (%) | 56 |
| Izod Impact (ft.lb./in.n.) | 11.8 |
| Gardner Impact (in.lbs.) | 240 |

EXAMPLE 2

Using procedures analogous to those employed in Example 1, a composition was prepared that contained 50 parts by weight of the poly(2,6-dimethyl-1,4-phenylene ether) resin, 35 parts by weight of the styrene-butadiene block copolymer and 15 parts by weight of the A-B-A block copolymer of styrene-butadiene-styrene. The test results were as follows:

| | |
|---|---|
| Tensile Yield (psi) | 5820 |
| Tensile Strength (psi) | 5800 |
| Elongation (%) | 32 |
| Izod Impact (ft.lb./in.n.) | 16.6 |
| Gardner Impact (in. lbs.) | 228 |

Obviously, other modifications or variations of the present invention are possible in the light of the above teachings. It is, therefore, to be understood that changes may be made in the particular embodiments of the invention described which are within the full intended scope of the invention as defined by the appended claims.

I claim:
1. A thermoplastic molding composition which comprises:
 (a) from 10–80 parts by weight of a polyphenylene ether resin;
 (b) from 30–65 parts by weight of a block copolymer of an alkenyl aromatic compound and a diene rubber, said copolymer having a major amount of said alkenyl aromatic compound; and
 (c) from 5–25 parts by weight of a hydrogenated block copolymer of the A-B-A type wherein A is an alkenyl aromatic block and B is a diene rubber block.

2. The composition of claim 1 wherein said polyphenylene ether resin is of the formula:

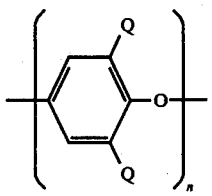

wherein the oxygen ether atom of one unt is connected to the benzene nucleus of the next adjoining unit; $n$ is the degree of polymerization; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

3. The composition of claim 1 wherein each Q is alkyl having from 1 to 4 carbon atoms.

4. The composition of claim 1 wherein each Q is methyl.

5. The composition of claim 1 wherein the block copolymer of an alkenyl aromatic compound and a diene rubber having a major amount of said alkenyl aromatic compound is a styrene-butadiene block copolymer having from 60–90 weight percent of styrene.

6. The composition of claim 1 wherein the hydrogenated block copolymer of the A-B-A type is a copolymer wherein prior to hydrogenation.
   i. each A is a polymerized mono-alkenyl aromatic hydrocarbon block having an average molecular weight of about 4,000–115,000;
   ii. B is a polymerized conjugated diene hydrocarbon block having an average molecular weight of about 20,000–450,000;
   iii. the blocks A constituting 2–23 weight percent of the copolymer;
   iv. 35–55% of the conjugated diene carbon atoms in blocks B being vinyl side chains;
   v. and the unsaturation of block B having been reduced to less than 10% of the original unsaturation, said hydrogenated block copolymer being present in an amount of from 10 to about 90% by weight of the total components of the composition.

7. A thermoplastic molding composition which comprises:
   (a) from 10–80 parts by weight of a polyphenylene ether resin;
   (b) from 30–65 parts by weight of a block copolymer of styrene-butadiene having from 60–90 parts by weight of styrene units per 100 parts by weight of block copolymer; and
   (c) from 5–25 parts by weight of a hydrogenated block copolymer of the A-B-A type wherein
   i. each A is a polymerized styrene block having an average molecular weight of about 8,000–60,000;
   ii. B is a polymerized butadiene block having an average molecular weight of about 50,000–300,000, 40–50% of the butadiene carbon atoms in the block being vinyl side chains;
   iii. the blocks A comprising 5–30% by weight of the copolymer; the unsaturation of block B having been reduced by hydrogenation to less than 10% of its original value.

8. The composition of claim 7 wherein said polyphenylene ether resin is poly(2,6-dimethyl-1,4-phenylene ether) resin.

9. The composition of claim 7 which includes 10–80 parts by weight of said poly(2,6-dimethyl-1,4-phenylene ether) resin; 30–65 parts by weight of component (b) and 5–25 parts by weight of component (c).

10. The composition of claim 1 including a flame retardant component.

11. The composition of claim 1 including a reinforcing filler.

12. A thermoplastic molding composition which comprises:
   (a) from 10–80 parts by weight of a polyphenylene ether resin;
   (b) from 30–65 parts by weight of a block copolymer of styrene-butadiene having from 60–90 parts by weight of styrene units per 100 parts by weight of block copolymer; and
   (c) from 5–25 parts by weight of a hydrogenated block copolymer of the A-B-A type wherein
   i. each A is a polymerized styrene block having an average molecular weight of about 8,000–60,000;
   ii. B is a polymerized butadiene block having an average molecular weight of about 50,000–300,000, 40–50% of the butadiene carbon atoms in the block being vinyl side chains;
   iii. the blocks A comprising 5–30% by weight of the copolymer; the unsaturation of block B having been reduced by hydrogenation to less than 10% of its original value.

13. The composition of claim 12 wherein the polyphenylene ether resin is poly(2,6-dimethyl-1,4-phenylene ether) resin.

14. The composition of claim 12 which includes from 20–50 parts by weight of component (a); from 20–50 parts by weight of component (b) and from 10–20 parts by weight of component (c).

* * * * *